Figure 1:
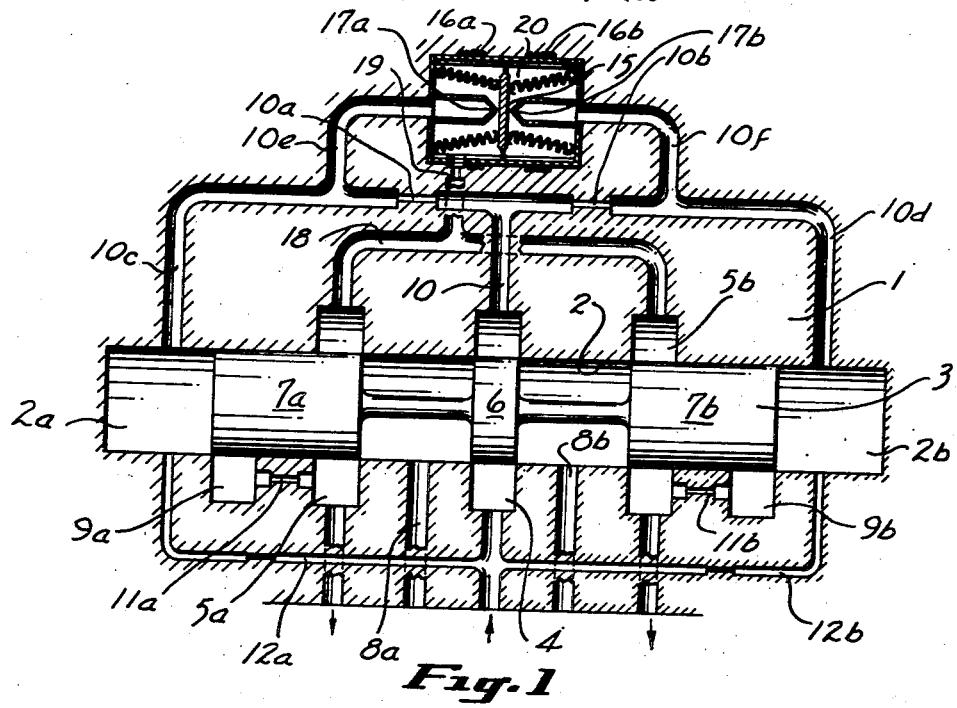

May 27, 1958  G. B. LANTZ  2,836,154
SELF-CENTERING SPOOL VALVE
Filed June 13, 1955

INVENTOR.
GLENN B. LANTZ
BY
Reynolds, Beach & Christensen
ATTORNEYS

United States Patent Office 2,836,154
Patented May 27, 1958

2,836,154

SELF-CENTERING SPOOL VALVE

Glen B. Lantz, Seattle, Wash., assignor to Boeing Airplane Company, Seattle, Wash., a corporation of Delaware Application June 13, 1955, Serial No. 514,968

5 Claims. (Cl. 121—46.5)

Spool valves are sometimes required to function with very little, or in some cases, with zero lap, so as to supply a pressure fluid to either of two service ports and to drain the opposite service port to low pressure. Such spool valves must be accurately located and maintained in a centralized position in order to prevent unwanted supply of pressure fluid to either service port, notwithstanding the lack of lap. Ordinarily, the centering is accomplished by means of valve springs which act upon the spool, and which must be accurately adjusted initially.

These springs, although they may be perfectly balanced at the time of installation, may not remain in that state due to various reasons; such, for instance, as metal fatigue, uneven wear, temperature changes, breakage, stress release, and warpage. There may be similar changes affecting the spring seats, the spacer assembly and adjuster assembly, and so from any of these causes the necessary perfect balance present at installation may disappear. Although it may be possible to restore such balance, it may not be convenient to do so, or imbalance may occur before it is realized that such is the case. The adjusting means also add to the bulk, weight, complexity and cost of the valve.

According to the present invention, such a spool valve is automatically centered purely and simply by hydraulic means, in conjunction with the pressure supply and return lines which are employed for supply to and return from the service ports controlled by the valve. In effect, the centering of the spool is accomplished by the equalization of two opposed pressure differentials between the pressure supply line and the return lines at the opposite ends of the valve spool. By so doing, the valve is made more reliable in operation and more sensitive. Its operation is uniform at all times, and this regardless of changing conditions, such, for instance, as temperature, or vibration. Its operation produces minimum friction due to the elimination of some moving parts, and the weight of these parts (the springs for example and their accessories) is eliminated, making the valve far more suitable for aircraft installation. With the valve capable of being made smaller and lighter, a minimum accelerating force is required. The spool is very positively centered at all times, and no adjustment is ever required to accomplish its centering. Because the valve is smaller, lighter and more simple, its cost will be reduced.

The principles of this invention are illustrated diagrammatically in the accompanying drawings, and will be more clearly understood by following this specification, and the claims which terminate the same.

Figure 2:
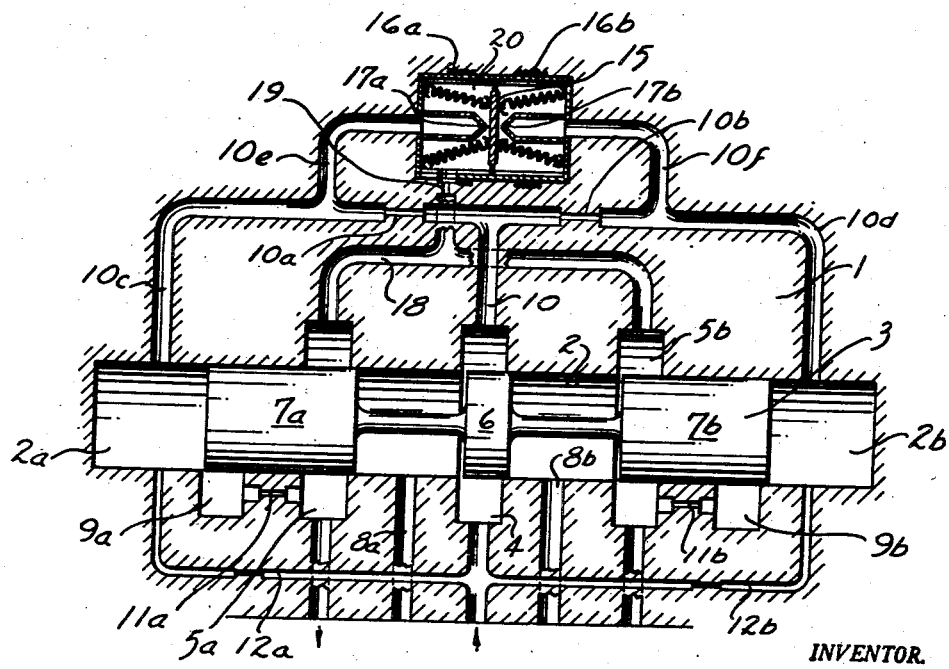

Figure 1 is a diagrammatic cut-away view, showing the valve according to the present invention in its centralized, or closed, position, and Figure 2 is a similar view, exaggeratedly showing the valve as it might appear if it had drifted slightly in one direction from its closed position.

The valve includes a casing, generally indicated by the numeral 1, having a bore 2 within which is axially slidably received a spool generally designated by the numeral 3. A pressure supply port 4 located centrally between the ends of the bore 2 communicates with that bore, while at opposite sides thereof are the return ports 5a and 5b. The spool valve 3 is formed with a central land 6 of a size to span and close the pressure supply port 4 when the valve spool is centralized (with or without a small lap, as the design may require), and two terminal lands 7a and 7b which are located to close the respective return ports 5a and 5b when the spool is centralized. Two service ports 8a and 8b communicate with the bore 2 intermediate the pressure supply port 4 and the return ports 5a and 5b, respectively. These service ports 8a and 8b lead to a device (not shown) to be operated by the pressure fluid, such for instance as the opposite ends of a double-acting hydraulic jack. When the valve is in its centralized position, as shown in Figure 1, with the pressure supply port 4 closed, and with both the return ports 5a and 5b blocked against access either to the pressure supply port 4 or to either return port, whatever pressure is applied within the respective service ports 8a and 8b is maintained but not changed.

A relief chamber 9a and a companion relief chamber 9b (there might be one such relief chamber only, but two make for greater simplicity) are formed in the valve casing 1 in position to be closed by the respective terminal lands 7a and 7b when the spool is centralized, but to be opened by that land in the event that the spool should drift in one or the other axial direction away from its centralized position. Thus, in Figure 2, the relief chamber 9a is shown as open to the centralizing chamber 2a at the end of the bore 2 beyond the land 7a, but the relief chamber 9b still remains closed and does not communicate with the corresponding centralizing chamber 2b at the opposite end of the bore.

These two centralizing chambers, 2a and 2b, are maintained normally pressurized alike. This may be accomplished by providing a pressure passage 10 from or communicating with the pressure supply port 4 and leading past one or more restricted orifices 10a and 10b in the respective branches 10c and 10d to the respective chambers 2a and 2b. In addition, each relief chamber is connected by a relief passage such as includes a restricted orifice 11a or 11b to one or the other, or to the respective ones, of the return ports 5a or 5b.

Additional pressure passages 12a and 12b, which also include restricted orifices, constitute alternate or supplemental connections between the pressure port 4 and the respective chambers 2a and 2b. The passages 10c and 10d are also employed in conjunction with the effectuation of the movement of the valve, as will be pointed out later. Thus, it is assured that at all times the pressure fluid will be supplied past restricted orifices to the centralizing bore end chambers 2a and 2b of the bore.

As has already been pointed out, with parts in the position shown in Figure 1, the pressure supply port 4 is closed to the bore 2, but open past restricted orifices to the two chambers 2a and 2b alike. The return ports 5a and 5b being closed, these two chambers 2a and 2b are equally pressurized, and since this pressure acts on equal areas, no movement of the spool ensues. If, however, the spool should tend, as a result of vibration, temperature change, or some other condition, to shift to the right, for instance, as shown in Figure 2, pressure in the chamber 2a may pass the end of the terminal land 7a and escape by way of the relief chamber 9a, the restricted orifice 11a, and the return port 5a. There being restricted orifices in the pressure lines 10c and 12a leading to the chamber 2a, pressure in this chamber drops. At the same time, the shift to the right of the spool has produced no effect in the chamber 2b except perhaps to increase the pressure slightly therein, for the relief chamber 9b at this end has not been opened. It follows that the superior pressure in the chamber 2b, acting against the now-reduced pressure in the chamber 2a, will cause the valve spool 3 to shift to the left again until all ports are closed, and equilibrium is automatically reestablished.

Initiation of movement of the spool when it is desired to supply pressure fluid to one or the other of the service ports 8a or 8b, may be accomplished in any suitable manner. As diagrammatically shown, a closure diaphragm 15 of magnetic material, spring-held in a centralized position within a control chamber 20, is moved, for instance, through energization of one or the other of the electromagnet coils 16a or 16b, to close one or the other of the restricted orifices 17a or 17b. These orifices are connected by means of the branch passages 10e and 10f with the pressure supply port 4, and the control chamber 20 into which both these orifices 17a and 17b discharge is ported to the return passage 18, and thence to the return ports 5a and 5b, and past the restricted orifice 19. If the magnetic diaphragm 15 be attracted by energization of the coil 16b, the orifice 17b will be closed, pressure will build up in the chamber 2b with which the branch passage 10f is most directly connected, until the pressure in this chamber 2b slightly exceeds the pressure in the chamber 2a. The spool valve will thereby be moved to the left to admit pressure from the pressure port 4 past the central land 6 for communication with the service port 8b, and in like manner, the terminal land 7a will open the return port 5a to the service port 8a. When the valve is to be closed, the coil 16b is de-energized, the springs center the diaphragm 15 and both orifices 17a and 17b are opened alike, whereupon an equlization of pressure as between the chambers 2a and 2b ensues in the manner already described, and the spool 3 returns to its centralized position.

I claim as my invention:

1. A self-centering spool valve comprising a casing having a bore closed at both its ends, and having pressure supply, return, and service ports communicating with the bore, a valve spool axially slidable within said bore between a centralized closed position and respective open positions at each side of such centralized position, the bore space beyond each end of the spool constituting a centralizing chamber, a pressure passage including a restricted orifice connecting each centralizing chamber with the pressure port, a relief chamber separate from the remaining chambers and ports, admitting to said bore in the vicinity of each centralizing chamber, the spool having a land at each end blocking communication between the corresponding centralizing chamber and the relief chamber when the spool is in its centralized position, and other lands which are located to block communication at the same time between the pressure port and either return port or either service port, but the centralizing chamber and the relief chamber coming into communication upon such axial shift of the spool as will afford communication between the pressure port and either service port or either return port, and a relief passage including a restricted orifice connecting such relief chamber with a return port.

2. A self-centering spool valve as in claim 1, including two separate relief chambers, one adjacent each centralizing chamber, each having a separate relief passage and restricted orifice connecting with a return port.

3. A self-centering spool valve as in claim 1, including additional pressure passages, a control chamber, restricted orifices in each additional pressure passage delivering into said control chamber, a diaphragm resiliently centralized between said restricted orifices and movable to close either thereof, a return passage, including a restricted orifice, from said control chamber to the return port, and means to shift said diaphragm to close a selected pressure passage orifice.

4. A self-centering spool valve comprising a casing having a bore closed at both ends and formed with two axially spaced service ports, a centrally disposed pressure supply port, and two return ports located beyond each service port from the pressure supply port, all communicating with said bore, a spool slidable in said bore and formed with three lands, namely, a central land of a size to close the pressure supply port when the spool is centralized, and two terminal lands at its opposite ends located to close the respective return ports when the spool is centralized, a pressure passage, including a restricted orifice, leading from the pressure supply port to the portions of the bore outwardly beyond the ends of the spool which portions constitute end chambers, to pressurize each such end chamber alike, a relief chamber located near each end of the bore, in position to be closed by the corresponding terminal land when the spool is centralized, but to be opened to the corresponding pressurized end chamber by shift of the spool from its centralized position, and a low pressure passage, including a restricted orifice, connecting the relief chambers to the return ports.

5. In combination, in a valve including a bored casing having two service ports, a pressure supply port intermediate the service ports and return ports outwardly beyond the respective service ports, all said ports communicating with the casing's bore, a spool formed with lands, including terminal lands at its respective ends, and slidable in said bore from a central closed position, in which the lands are spaced axially to close both the pressure supply and the return ports, and to define end chambers in the bore outwardly of the spool's ends, in either axial sense into an open position wherein the pressure port is in communication with one or the other of the service ports, and the other service port is in communication with a return port, a pressure passage, including a restricted orifice, leading from the pressure supply port to each end chamber of the bore, a relief chamber at each end of the casing, located outwardly of the return port to be closed by the terminal land of the spool when the spool is centralized, but to be opened to the end chamber beyond the spool upon shift of the spool from its centralized position, and a low pressure passage, including a restricted orifice, connecting the relief ports to the return ports.

References Cited in the file of this patent

UNITED STATES PATENTS

| 542,628 | Clark | July 16, 1895 |
| 1,495,058 | Wille | May 20, 1924 |
| 2,675,652 | Chiappulini | Apr. 20, 1954 |
| 2,709,421 | Avery | Mar. 31, 1955 |